United States Patent Office 3,510,474
Patented May 5, 1970

3,510,474
REACTION OF CYANOGEN AZIDE WITH
SELECTED ORGANIC COMPOUNDS
Frank Dennis Marsh, Wilmington, Del., assignor to E. I.
du Pont de Nemours and Company, Wilmington, Del.,
a corporation of Delaware
No Drawing. Continuation-in-part of application Ser. No.
234,878, Nov. 1, 1962. This application July 16, 1964,
Ser. No. 383,233
Int. Cl. C07d 23/06
U.S. Cl. 260—239                                    18 Claims

ABSTRACT OF THE DISCLOSURE

Described and claimed are processes for reacting cyanogen azide with organic compounds containing the nonaromatic

bond and/or the

bond at about −25° C. up to about 150° C., and thereby producing N-cyanoaziridines or N-cyanoimines.

RELATED APPLICATION

This application is a continuation-in-part of my copending application, Ser. No. 234,878 filed Nov. 1, 1962, and now abandoned.

This invention relates to, and has as its principal objects provision of, the novel process which comprises reacting cyanogen azide, N₃CN, with an aliphatic organic monomeric compound containing the carbon-hydrogen bond,

and/or the ethylenic, i.e., nonaromatic, carbon-carbon double bond,

Warning.—Cyanogen azide, a reactant in the process of this invention, is explosive when free or nearly free of solvent and should be handled with great care. It can be used, however, with comparative safety in dilute or moderately concentrated solution.

DESCRIPTION OF THE INVENTION

This invention comprises contacting cyanogen azide with an aliphatic, including cycloaliphatic, organic reactant at a temperature in the range from about −25° C. to up to about 150° C. The precise temperature employed will depend upon the organic reactant, an ethylenically unsaturated compound reacting generally at a lower temperature than a saturated one. Thus, the ethylenically unsaturated compounds will usually react at a temperature ranging from about −25° C. to 75° C., 0° C. to 55° C. normally being used, while the saturated compounds will react at about 25° C. to 150° C., 40° C. to 100° C. being preferred. The ethylenically unsaturated compounds will, of course, react at the higher temperatures and, when both carbon-hydrogen and carbon-carbon double bonds are present, reaction will occur at both groups above about 40° C.

The pressure used is not critical and will generally be atmospheric or moderately elevated, depending on the volatility of the reactants.

The time required to effect reaction will vary from a few minutes with highly reactive ethylenic compounds to several hours or more with less reactive compounds. The course of the reaction can be followed, if desired, by measuring the amount of nitrogen evolved, one molecule of nitrogen being liberated for each molecule of cyanogen azide that reacts.

The cyanogen azide used in the reaction can be preformed or formed in situ. If preformed cyanogen azide is used, it can be prepared as follows:

A 125-ml. flask equipped with a condenser, thermometer, magnetic stirrer, gas-inlet tube, and nitrogen bubbler is flame-dried and cooled to room temperature under nitrogen. Sodium azide (16.25 g., 0.25 mole) and dry acetonitrile (48.5 g., 62.5 ml.) are added and the flask is cooled to from −10° to 0° C. in an ice-salt bath. Ice water or a coolant at −5° to 0° C. is circulated through the condenser and 20 ml. (24.0 g., 0.39 mole) of cyanogen chloride is distilled into the flask with good agitation at such a rate as to maintain a temperature below 12° C. After completion of the addition, the mixture is stirred for ½ hour at 0° to 10° C. and then allowed to warm slowly to room temperature over a period of one hour. Although the reaction is essentially complete at this point, the mixture can be stirred overnight at room temperature. Excess cyanogen chloride is removed by evacuation through the cooled condenser (0° C.) at 95–120 mm. pressure for about one hour, with stirring. The solution which remains in the flask is filtered under nitrogen and the filter cake washed twice with a total of 10 ml. of dry acetonitrile. The combined filtrate (67–72 ml.), which consists of a solution of cyanogen azide in acetonitrile, can be used directly or stored under nitrogen at −20° C. for subsequent use.

Cyanogen azide is shock-sensitive and to some extent thermally unstable. Its solutions in organic solvents, e.g., acetonitrile, ethyl acetate, or toluene, however, are stable for several days at room temperature and can be stored indefinitely at temperatures below 0° C. The temperature of storage should not be so low as to cause the solvent to solidify or to reduce the solubility of the cyanogen azide to the extent that it separates as a substantially solvent-free, shock-sensitive second phase. Preferred storage temperatures are −30° to 0° C.

Solutions containing up to 90% or even higher amounts of cyanogen azide in organic solvents can be prepared by the reaction of cyanogen chloride with either an alkali metal or ammonium azide as described above. However, solutions containing in the neighborhood of 20 to 40% by weight of cyanogen azide are preferred for reasons of safety and convenience in handling.

Because of the relative instability of cyanogen azide, it is best to generate it either in the presence of the aliphatic organic reactant, or in the presence of a reaction medium. In the latter procedure, the aliphatic organic reactant is added to the medium which contains the preformed cyanogen azide. Alternatively, the cyanogen azide solution can be added to the aliphatic organic reactant.

In the process of this invention there can be used any aliphatic, including cycloaliphatic, compound containing a carbon-hydrogen bond. These compounds can be acyclic or carbocyclic and saturated or ethylenically unsaturated, but are free of acetylenic unsaturation. The presence of aromatic unsaturation, in addition to ethylenic, is immaterial although competing reactions may take place.

When saturated and monoethylenically unsaturated organic compounds are reacted with cyanogen azide, the reactants are employed in essentially equimolar proportions. There is nothing critical about these proportions, however, and one or the other reactant can be present in excess. With polyethylenically unsaturated compunds the reaction with cyanogen azide can be controlled to take place at part or all of the ethylenic double bonds, depending upon the ratio of the reactants and conditions of reaction selected. If, for example, the reactant is a diolefin and it is desired to effect reaction at both double bonds, at least two moles of the cyanogen azide will be needed per mole of the diolefin; if the reactant is a triolefin and it is desired to effect reaction at all three double bonds, at least three moles of cyanogen azide will be needed per mole of triolefin.

When the organic compound is a liquid under the conditions of reaction, it can be used both as reaction medium and reactant. When a separate reaction medium is used, it should be one which is normally liquid and substantially inert toward the reactants and reaction products at the reaction temperature employed. It is therefore to be understood that the medium in any one instance must be selected with due consideration of the reaction conditions to be used. Suitable reaction media for many olefins are propionitrile, acetonitrile, ethyl acetate, amyl acetate, 1,2-dimethoxyethane, dimethylformamide, 1,1,2,2-tetrachloroethane, isooctane, methylene chloride, carbon tetrachloride, and 1,2-dibromoethane.

The nature of the reaction between cyanogen azide and the organic compound depends upon whether the latter is saturated or ethylenically unsaturated. With ethylenically unsaturated compounds, the reaction occurs at low temperatures, i.e., below 50° C., essentially exclusively at the double bonds with virtually no attack at carbon-hydrogen bonds. At temperatures above 50° C., cyanogen azide decomposes to nitrogen and cyanonitrene,

and the latter reacts rapidly with double bonds and carbon-hydrogen bonds.

In the case of compounds containing ethylenic unsaturation, the reaction can proceed with the formation of either an N-cyanoaziridine or an N-cyanoimine, or both. A general equation can thus be written, employing a monomeric ethylenic coreactant, as:

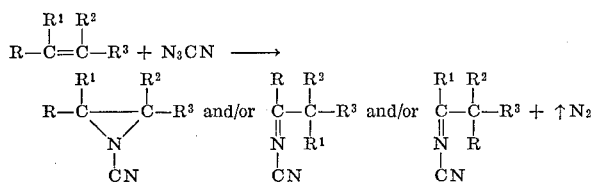

wherein the R's in the monomeric coreactants individually are members of the group consisting of hydrogen, halogen, nitro, hydroxy, cyano, alkoxy, aryloxy, alkylsilyl, alkylthio, acyl, acyloxy, carboxyl, carbamoyl, N-hydrocarbylcarbamoyl, hydrocarbyloxycarbonyl, e.g., alkoxycarbonyl, hydrocarbyl, including alkyl, aryl, aralkyl, alkylaryl, cycloalkyl, and alkenyl, and substituted hydrocarbyl groups containing one or more of the previously mentioned groups as substituents, e.g., haloalkyl, haloaryl, hydroxyalkyl, hydroxyaryl, cyanoalkyl, cyanoaryl, alkoxyalkyl, and alkoxyaryl, said R's individually containing up to 18 carbons; and where any two R's may be joined together to form an alkylene, cycloalkenylene or oxygen-interrupted alkylene group of up to 14 carbons. Preferably, the entire compound reacted contains up to a total of 18 carbons. It will be understood that the equations above, like those given subsequently, (1) are not intended to imply that only one molecule of cyanogen azide can react with the other reactant, but rather illustrate the reaction in a very general, simplified form, and (2) do not account for the rearrangement of the R's in the N-cyanoimine-forming reaction.

As the equations indicate, the reactions leading to formation of N-cyanoaziridines and N-cyanoimines are competitive. The relative proportions of the two in any one instance will, therefore, vary depending upon the particular ethylenically unsaturated compound used, and the conditions employed, especially the reaction medium. Generally, the use of polar reaction media favors the N-cyanoaziridine-forming reaction, and conversely nonpolar reaction media, or no media, favor the N-cyanoimine-forming reaction. This effect of the medium in favoring N-cyanoaziridine or N-cyanoimine formation is illustrated in Examples 9 and 18.

A wide variety of ethylenically unsaturated compounds can be reacted with cyanogen azide in preparing the products of this invention. The ethylenic compound can be monoethylenic or polyethylenic, cyclic or acyclic, and substituted or unsubstituted. When the ethylenic compound contains one or more substituents, i.e., when it is not wholly hydrocarbon, each substituent is preferably at least one carbon removed from the ethylenically bonded carbons, if the substituent is of the electron withdrawing type. Some polymerization of the ethylenic compound may occur as a side reaction, particularly in the case of readily polymerizable vinyl compounds.

Examples of simple monomeric monoethylenic compounds which can be used include ethylene, propylene, 3-phenyl-1-propene, butene-1, butene-2, isobutylene, hexenes, octenes, dodecenes, octadecenes, 1,2-dimethylcyclopropane, cyclobutene, cyclopentene, methylenecyclobutane, methylcyclopentene, methylenecyclopentane, methylenecyclohexane, cyclohexene, cycloheptene, cyclodecene, cyclododecene, vinylcyclohexane, bicycloheptene, styrene, p-ethylstyrene, β-vinylnaphthalene, stilbene, and substituted monoethylenic compounds, such as allyl bromide, allyl alcohol, allyl acetate, allyl phenol, vinyl chloride, vinyl fluoride, vinylidene chloride, vinylidene fluoride, tetrafluoroethylene, vinyl methyl ketone, alkyl phenyl ether, vinyl ethyl ether, vinyl phenyl ether, dihydrofuran, dihydropyran, vinyl ethyl sulfide, vinyl acetate, vinyl butyrate, nitroethylene, 3-nitro-1-propene, p-nitrostyrene, acrylonitrile, methacrylonitrile, 1,4-dicyanobutene-2, allyl cyanide, acrylic acid, crotonic acid, maleic acid, cinnamic acid; ethyl crotonate, butyl acrylate, benzyl acrylate, methyl methacrylate, acrylamide, N-diethyl acrylamide, m-iodostyrene, p-cyanostyrene, o-hydroxystyrene, o-methoxystyrene, and 2-(β,β-dicyano-α-hydroxy-vinyl) - 4-methylphenol (U.S. 2,726,249).

Typical examples of dienes and other polyenes that can be used as the ethylenic reactant are butadiene, isoprene, chloroprene, 2,4-hexadiene, diallyl, cyclopentadiene, dicyclopentadiene, vinyl cyclohexene, divinyl ether, 1,5-cyclooctadiene, 1,3,5-hexatriene, and cyclooctatetraene.

The preferred unsaturated reactants are substituted and unsubstituted ethylenic (i.e., olefinic) hydrocarbons of the formula $R(R^1)C=C(R^2)(R^3)$, particularly those of 2–12 carbons. Halogen, cyano, hydroxy, carboxyl, alkoxy, and alkoxycarbonyl are the preferred substituents for the substituted hydrocarbon reactants.

In the case of saturated compounds or, generically, alkanes, the reaction proceeds at temperature above 50° C. at a carbon-hydrogen bond with the elimination of nitrogen and formation of a compound having a cyanamid group, e.g.,

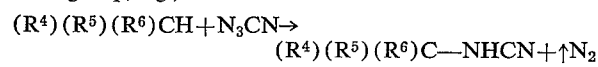

where the R's individually can be hydrogen, halogen, nitro, cyano, alkoxy, acyl, acyloxy, carboxy, carbamoyl (—CONH$_2$), hydrocarbyl, i.e., alkyl including cycloalkyl, substituted alkyl and cycloalkyl containing one or more of the hereinbefore mentioned groups, e.g., haloalkyl, nitroalkyl, cyanoalkyl, and alkoxyalkyl, halocycloalkyl, nitrocycloalkyl, cyanocycloakyl, akoxycycloalkyl, etc., the R's individually containing up to 18 carbons, and wherein any pair of R's, e.g., $R^4$ and $R^5$, $R^5$ and $R^6$, or $R^4$ and $R^6$, may be alkylene of 2 to 7 carbons, which may be joined together through the CH group to form a cycloalkyl or oxygen-interrupted cycloalkyl group of 3 to 8 carbons. Preferably, the entire compound reacted contains up to a total of 18 carbons.

Typical aliphatically saturated organic monomeric reactants include cyclopropane, cycloheptane, cyclohexane, cyclooctane, decahydronaphthalene, nitrocyclohexane, chlorocyclohexane, cyclohexane carboxylic acid, cyclohexane-carbonitrile, bicyclo[2.2.1]heptane, methane, propane, isoctane, dodecane, nonadecane, octadecane, 2,4,4-trimethylpentane, 1-nitrooctane, 2-chloropropane, t-butyl chloride, ethyl acetate, octyl acetate, 1,4-dicyanobutane, sebacic acid, butyramide, dioxane, tetrahydrofuran, diethyl ether, ethylene glycol dimethyl ether, methyl ethyl ketone and the like.

The products of this invention may be roughly divided into two groups, those derived from ethylenically unsaturated precursors and those derived from aliphatically saturated precursors, although it must be realized that mixed types also exist.

The products obtained by reaction of cyanogen azide with ethylenically unsaturated compounds vary in complexity from comparatively simple compounds obtained by reaction of a single molecule of cyanogen azide with a single molecule of a monomeric compound containing a single ethylenic linkage to products obtained by reaction of a number of cyanogen azide molecules with a single molecule containing a plurality of ethylenic linkages. The basic reaction in all instances is the same, however, and results in the formation of products containing one or more of the characteristic groups,

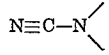

wherein the dangling valences are attached either to two separate adjoining carbons of an organic group thereby forming an N-cyanoaziridine, i.e., a compound containing an N-cyanoazacyclopropyl group, or to a single carbon of an organic group to form an N-cyanoimine. In the reaction of cyanogen azide with a monoethylenic compound, a mixture of N-cyanoaziridine and N-cyanoimine is generally formed, whereas in the addition of cyanogen azide to compounds containing two or more ethylenic groups, the products may contain both N-cyanoaziridine and N-cyanoimine groups in the same molecule. These reaction products and their preparation are described more specifically below with reference to different ethylenic compounds:

N-cyanoaziridines of the formula

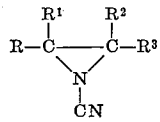

wherein the R's (R, $R^1$, $R^2$, and $R^3$) are as defined above. These compounds are obtained by the reaction of cyanogen azide with monomeric ethylenic compounds of the formula $R(R^1)C=C(R^2)R^3$; and N-cyanoimines of the formula

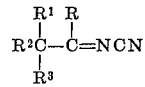

These compounds are likewise obtained by reaction of cyanogen azide with monomeric ethylenic compounds of formula $R(R^1)C=C(R^2)R^3$, wherein the R's have the previously indicated meanings. A preferred group of N-cyanoalkylideneimines are those of the formula

wherein $R^8$ is a cyclopentylidene or bicycloheptylidene.

The products derived from aliphatically saturated compounds vary in complexity much as those derived from ethylenically unsaturated precursors, i.e., from those obtained from reacting one mole of cyanogen azide with one mole of a monomer to those produced by reacting cyanogen azide with several CH-containing sites. Irrespective of the nature of the precursor, the basic reaction is the same and results in the formation of products containing one or a plurality of cyanamido, i.e., —NHCN groups, wherein the dangling valence is attached directly to the carbon to which the hydrogen that migrated to form the cyanamido group was originally attached. (3) Some of the products are new and some are old, and can be discussed only on an individual basis.

EMBODIMENTS OF THE INVENTION

There follow some examples which are intended to illustrate, but not to limit, the invention. Examples 1–27 illustrate the reaction of cyanogen azide with ethylenically unsaturated compounds and the products obtained thereby. Some of these examples show isolation of the principal product only, whereas others, where both the N-cyanoaziridine and the N-cyanoimine are formed in substantial amounts, show the isolation of both products. Examples 28–41 show the reaction between cyanogen azide and saturated compounds containing the C—H bond.

EXAMPLE 1

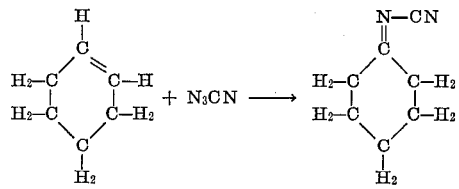

A 100-ml. flask equipped with a wet-ice condenser, magnetic stirrer, gas-inlet tube, and nitrogen bubbler was assembled, flame-dried and cooled to ambient temperature under nitrogen. Sodium azide (3.25 g., 0.05 mole, sieved through a 60 mesh screen) was added and the flask cooled in a solid carbon dioxide-acetone bath. Cyanogen chloride (28.8 g., 0.47 mole) was condensed into the flask and allowed to warm to reflux temperature for 24 hours under nitrogen. Pure cyclohexene (20 ml., 16.2 g., 0.197 mole) was then added during ½ hour. The mixture was stirred at room temperature for 15 hours and finally warmed slowly to 68° C. during 1½ hours. The resulting slurry of product and sodium chloride was cooled to room temperature, diluted with acetone (20 ml., 15.8 g., 0.27 mole), and filtered. Removal of the solvent from the filtrate under reduced pressure gave 5.75 g. (yield 94%) of a light straw-colored oil. Distillation of this oil in an acid-washed still gave 4.55 g. (74.5% yield) of pure 1-N-cyanoiminocyclohexane (B.P. 25–26° C./0.2$\mu$; $n_D^{25}$, 1.5025).

Analysis.—Calcd. for $C_7H_{10}N_2$ (percent): C, 68.81; H, 8.24; N, 22.93. Found (percent): C, 69.01; H, 8.42; N, 23.35, 23.09.

Infrared analysis of this product showed strong absorption at 4.55$\mu$ and 6.15$\mu$, which is consistent with the structure of the product.

1-N-cyanoiminocyclohexane obtained as above polymerized readily when heated and the polymer thus obtained is useful as a protective coating.

EXAMPLE 2

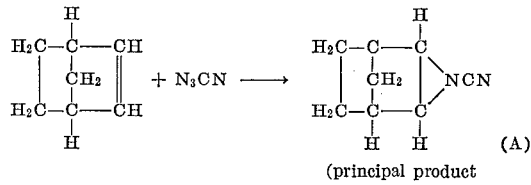

(principal product

Using essentialy the procedure described in Example 1, sodium azide (19.5 g., 0.3 mole, sieved through a 60 mesh screen), cyanogen chloride (115 g., 1.87 mole), and bicyclo[2.2.1]hept-2-ene (50 g., 0.54 mole) were refluxed (ca. 16–18° C.) for about 20 hours, during which time nitrogen was liberated. The mixture was then heated to 55° C. to remove excess cyanogen chloride, cooled to ambient temperature, and then diluted with 50 cc. (39.6 g.) of dry acetone. The mixture was filtered under nitrogen to separate sodium chloride and the solvent removed from the filtrate on a rotary evaporator at 0.3 mm./50° C. thereby leaving 5 g. of product mixture. This mixture consisted of approximately 80% of the N-cyanoaziridine, 3-cyanoazatricyclo[3.2.1.0²·⁴]octane, shown in Formula A above, and 20% of the N-cyanoalkylideneimine, bicyclo[2.2.1]heptane-2-N-cyanoimine, Formula B, below:

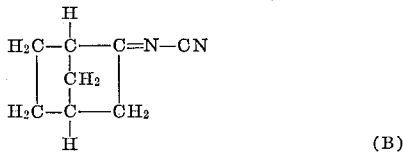

The components of the above mixture (5 g.) were separated and identified as follows: The mixture was passed over a column packed with 160 g. of a neutral hydrous alumina. The column was eluted with benzene, and the solvent was evaporated yielding a colorless, mobile liquid whose infrared spectrum was the same as that of the starting material, except for the following:

(a) The original band at 6.1µ (>C=N) was absent.
(b) A new band appeared at 5.75µ (>C=O).

The new band was attributed to norcamphor from the hydrolysis of the bicyclo[2.2.1]heptan-2-N-cyanoimine (compound B). Distillation of the chromatographed mixture removed the volatile norcamphor which was isolated and identified as its 2,4-dinitrophenylhydrazone derivative, melting point 130° C. The 5.75µ band was absent in the remaining liquid. The remainder of the spectrum was unchanged. This material was assigned the structure of compound A, 3-cyanoazatricyclo[3.2.1.0²·⁴]octane.

The structure of the N-cyanoaziridine derivative was further verified by reduction with lithium aluminum hydride as follows:

To 300 ml. of dry diethyl ether in a 500-ml. flask, equipped with a magnetic stirrer and drying tube, 3 g. (0.08 mole) of lithium aluminum hydride was added. The mixture was stirred at room temperature for 24 hours, and there was then added 2.5 g. (0.02 mole) of the adduct of cyanogen azide with bicyclo[2.2.1]hept-2-ene in 35 ml. of diethyl ether over a period of 30 minutes. The reaction mixture was stirred for 26 hours at room temperature and was then decomposed with a saturated solution of sodium sulfate. The inorganic salts were removed by filtration and the filtrate evaporated to yield 2.3 g. of a mobile amine-smelling liquid. The nitrile band (4.5µ) in the infrared spectrum was essentially absent.

To 900 mg. of the amine obtained as above in 7 ml. of cyclohexane there was added 2 g. (0.015 mole) of phenyl isothiocyanate. The exothermic reaction which ensued was cooled in an ice bath and the resultant solid triturated with 40 ml. of cyclohexane. It was then filtered to yield 1.3 g. of a product melting at 100–113° C. Recrystallization from ethanol or benzene in petroleum ether mixture gave white needles melting at 116–118° C.

The infrared and nuclear magnetic resonance spectra were in accord with the structure of 3-azatricyclo-[3.2.1.0²·⁴]octane-3-thiocarboxanilide:

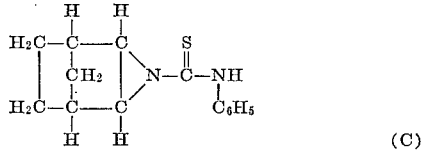

*Analysis.*—Calcd. for $C_{14}H_{16}SN_2$ (percent): C, 68.8; H, 6.6; N, 11.5; S, 13.12. Found (percent): C, 68.86, 68.86; H, 6.68, 6.72; N, 11.33, 11.39; S, 13.23, 13.47.

EXAMPLE 3

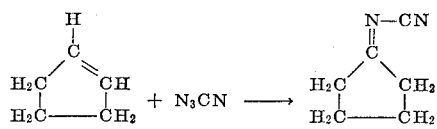

A 300-ml. flask equipped with an ice-cooled condenser, gas inlet, nitrogen bubbler, and magnetic stirrer was assembled, flame-dried, and cooled to ambient temperature under nitrogen. Sodium azide (9.75 g., 0.15 mole, sieved through a 60 mesh screen) was added and the flask cooled in a solid carbon dioxide-acetone bath, while pure cyclopentene (30 cc., 23.2 g., 0.34 mole) and cyanogen chloride (40 ml., 48.8 g., 0.79 mole) were added. The mixture was allowed to reflux, with stirring, for 22 hours, during which time nitrogen was liberated. The excess cyanogen chloride was then removed by heating at 50° C. for one hour. The resulting slurry was cooled to 10° C., diluted with dry ether (50 ml., 35.5 g., 0.47 mole), and filtered under nitrogen. Removal of the solvent from the filtrate on a rotary evaporator at 1 mm./40° C. gave 15.85 g. (98% yield) of an almost colorless oil. Distillation of this oil in an acid-washed short path still gave pure 1-N-cyanoiminocyclopentane (15.2 g., 94% yield; $n_D^{25}$, 1.4944). The melting point of the main fractions ranged from −20.5 to −21° C., as determined by differential thermal analysis. Mass spectrographic and infrared analyses of the product were in good agreement with the structure 1-N-cyanoiminocyclopentane.

Elemental analysis and molecular weight determinations on a sample obtained from a duplicate experiment were as follows:

*Analysis.*—Calcd. for $C_6H_8N_2$ (percent): C, 66.64; H, 7.45; N, 25.91. Found (percent): C, 67.09; H, 7.76; N, 25.62.

Mol. wt. calcd. for $C_6H_8N_2$: M.W., 108.15. Found: M.W., 99, 98 (freezing point in benzene).

Hydrolysis of the 1-N-cyanoiminocyclopentane yielded cyclopentanone, cyanamide, and urea, as illustrated below.

1-N-cyanoiminocyclopentane, prepared as in Example 3 (5.40 g., 0.05 mole), and ether (10 ml., 7.1 g.) were added to distilled water (25 ml., 25 g.), acidified with 10% sulfuric acid (6 drops), and the mixture was heated with stirring at 45–49° C. for five hours. After standing at room temperature for 16 hours, the temperature of the reaction mixture was raised to 54° to 59° C., where it was held for 3¾ hours. The solution was then cooled to ambient temperature and evaporated to dryness on a rotary evaporator at 0.3 mm./40° C. There remained a white solid A (2.35 g.) and a volatile portion B. Extraction of A with ether and evaporation of the extract to dryness separated pure crystalline cyanamide (1.65 g., yield 78.6%) which was identified by comparison of its infrared spectrum with a known sample and by infrared and elemental analysis of the silver salt.

*Analysis.*—Calcd. for $Ag_2NCN$ (percent): N, 10.95. Found (percent): N, 11.36, 11.44.

The ether-insoluble fraction A (0.65 g., yield 21.6%) was chiefly urea (M.P. 130–133.5° C.). After one recrystallization from acetone there was obtained 0.55 g. of urea melting at 131–133.5° C. A second recrystallization from absolute ethyl alcohol and ether gave pure urea (0.40 g., M.P. 135–136° C., yield 13.3%) which was identical in melting and mixed melting point with an authentic sample.

Extracting the volatile fraction B with ether in a continuous extractor followed by drying the extract over magnesium sulfate, filtering, and removing the solvent from the filtrate on an efficient column gave cyclopentanone (3.1 g., yield 74%) which was identified by infrared analysis, and by a 2,4-dinitrophenylhydrazone derivative (M.P. 145.6–146.2° C.). A mixed melting point of this derivative with the 2,4-dinitrophenylhydrazone prepared from an authentic sample of cyclopentanone was not depressed (mixed melting point 145.6–146.4° C.).

To a flask equipped with a condenser, dropping funnel, magnetic stirrer, and thermometer was added silver nitrate (17.0 g., 0.1 mole) and distilled water (50 ml., 50 g., 2.8 moles). When solution was complete, 1 - N - cyanoiminocyclopentane, prepared as described above (5.41 g., 0.05 mole), was added over a period of five minutes. A mild exothermic reaction occurred and a small amount of yellow precipitate formed. Ether (5 ml., 3.6 g.) was added and the mixture heated at 40–50° C. for 20 minutes, and then cooled to ambient temperature. Addition of ammonium hydroxide (20 ml., 14%=2.8 g. NH$_4$OH+17.42 g. H$_2$O) caused additional yellow precipitate to form. The solid product was separated by filtration, washed on the filter with distilled water, and dried over P$_2$O$_5$ at 0.1 mm./ 60–70° C. (weight 12.70 g., yield 99.3%). The infrared spectra of this compound was identical with that of a known sample of silver cyanamide.

Analysis.—Calcd. for Ag$_2$CN$_2$ (percent): Ag, 84.35; C, 4.69; N, 10.95. Found (percent): Ag, 83.03; N, 11.03.

The filtrate was extracted with ether in a continuous extractor for 20 hours, the ether layer dried over anhydrous magnesium sulfate, filtered, and the ether removed by distillation. There remained 4.0 g. (95% yield) of product containing cyclopentanone, identified by infrared analysis. Distillation of the crude product gave 3.73 g. (89% yield) of material having an $n_D^{25}$ of 1.4353 and whose infrared spectrum was identical with that of authentic cyclopentanone.

EXAMPLE 4

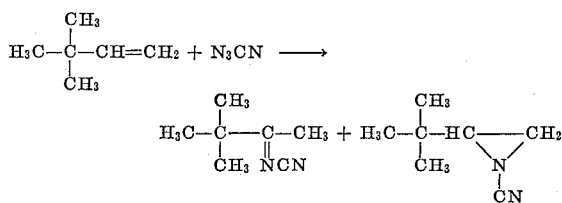

To a solution of cyanogen azide prepared as described in Example 5 from activated sodium azide (19.50 g., 0.3 mole) and cyanogen chloride (67 g., 1.1 mole) in acetonitrile (120 ml., 93.5 g., 2.28 mole) was added 3,3-dimethyl-1-butene (57 g., 0.68 mole). The mixture was heated at 34–43° C. for 15 hours, during which time ca. 0.3 mole of nitrogen was liberated. Continued heating at this temperature for 1½ additional hours caused no further nitrogen evolution. After cooling to room temperature the mixture was diluted with ether, filtered, and the solvent and excess olefin removed in a rotary evaporator at 0.3 mm. and room temperature. There remained 35.61 g. (95.5% yield) of a light tan mobile oil. Distillation of this oil through a molecular type still at 0.3 mm. gave 29.58 g. (79.4% yield) of mixture of isomers consisting of ca. 74% 2,2-dimethyl-3-N-cyanoiminobutane and 26% 2-tertiary butyl-1-N-cyanoaziridine. Fractionation of 22.78 g. of this material through a 17 in. x 8 mm. spinning band column separated pure 2,2-dimethyl-3-N-cyanoiminobutane. Infrared and NMR analysis of the lower boiling fractions indicated that it contained major amounts of 2- tertiary butyl-1-cyanoaziridine.

EXAMPLE 5

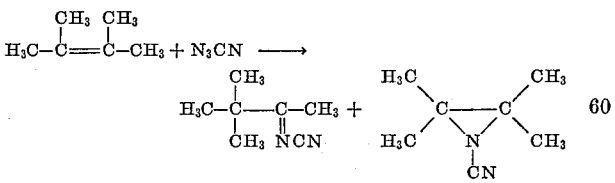

A 500 ml. flask equipped with an ice-cooled condenser, magnetic stirrer, dropping funnel, nitrogen bubbler, and gas-inlet tube was assembled, flame-dried, and cooled to ambient temperature under nitrogen. Sodium azide (32.5 g., 0.5 mole) and dry acetonitrile (200 ml., 156.6 g.) were added and the flask cooled in an ice-salt bath. Cyanogen chloride (80 ml., 97.4 g., 1.58 mole) was distilled into the reaction mixture over a period of 1¾ hours at such a rate as to maintain the temperature between 4–18° C. When addition was complete, the reaction mixture was warmed to 25° C. and 2,3-dimethyl-2-butene (88.25 g., 1.05 mole) was added rapidly through the dropping funnel.

During a reaction period of 14 hours at 30–38° C., ca. 0.5 mole of nitrogen was evolved. Heating at this temperature was continued for an additional two hours. The mixture was cooled to room temperature, diluted with ether (100 ml., 71.4 g.), filtered, and the solvent removed from the filtrate on a rotary evaporator at 0.3 mm. and room temperature. There remained 60.65 g. (98% yield) of a mixture of isomeric products. Distillation of the total product through a molecular type still at 0.1 mm. and a bath temperature of 32–47° C. gave a colorless oil (60.34 g., 97.2% yield) consisting of ca. 92% 2,2-dimethyl-3-N-cyanoiminobutane and 8% 1-cyano 2,2,3,3-tetramethylaziridine as determined by NMR spectra. Fractionation of a 31.7 g. aliquot of this oil through a 17 in. x 8 mm. spinning band column separated pure 2,2-dimethyl-3-N-cyanoiminobutane (B.P. 38–40° C./0.05 mm.; $n_D^{25}$ 1.4570).

Analysis.—Calcd. for C$_7$H$_{12}$N$_2$ (percent): C, 67.69; H, 9.74; N, 22.56. Found (percent): C, 68.07; H, 9.85; N, 23.02.

A slightly lower boiling fraction (B.P. 36° C./0.03 mm.; $n_D^{25}$, 1.4561) consisted predominantly of 1-cyano-2,2,3,3-tetramethylaziridine.

Analysis.—Calcd. for C$_7$H$_{12}$N$_2$ (percent): C, 67.69; H, 9.74; N, 22.56. Found (percent): C, 67.92; H, 9.73; N, 22.61.

2,2-dimethyl-3-N-cyanoiminobutane was identified by infrared and NMR spectra and by hydrolysis to pinacolone and cyanamide. 1-cyano-2,2,3,3-tetramethylaziridine was identified by its characteristic unsplit resonance at −83 cps. relative to tetramethylsilane.

EXAMPLE 6

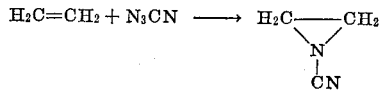

An acetonitrile solution (55 ml.) containing 13.6 g. (0.20 mole) of cyanogen azide was placed in a 240 ml. nickel-molybdenum-iron alloy-lined tube and pressured with 18 g. (0.64 mole) of ethylene. The tube was held at 21–27° C. for 20 hours, during which time the internal pressure rose from 480 p.s.i. to 740 p.s.i. The resulting solution was poured into 500 ml. of ether and about 3 g. of polymeric material was removed by filtration. After the filtrate was evaporated to 5.5 g., the residue was distilled through a short path still at a pot temperature of 30–35° C./0.2 mm. to give about 2 g. (15%) of 1-cyanoaziridine, a colorless oil.

Analysis.—Calcd. for C$_3$H$_4$N$_2$ (percent): C, 52.9; H, 5.9; N, 41.2. Found (percent): C, 51.8; H, 5.9; N, 41.3.

Infrared analysis of this product showed strong absorption at 4.50μ (—C≡N) and 6.80μ, 6.90μ (—CH$_2$), with no absorption at 6.0–6.2μ characteristic of the

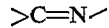

group, and none at 7.2–7.4μ (—CH$_3$). The NMR spectrum shows only one absorption at τ=7.53.

EXAMPLE 7

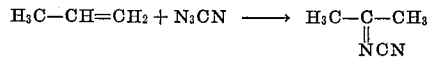

A mixture of 3.25 g. (0.05 mole) of sodium azide and 20.3 g. (26 ml.) of acetonitrile was placed in an 80 ml. nickel-molybdenum-iron alloy-lined tube. The tube was cooled, and 6 g. (0.10 mole) of cyanogen chloride and 6 g. (0.14 mole) of propylene were added. The reactor was sealed and the charge held at 35° C. for 16 hours, during which time the pressure rose from 80 to 290 p.s.i. At this point, 7.7 g. (0.11 mole) of cyclopentene was added to decompose any residual cyanogen azide. However; over a period of four hours there was no pressure rise so the product was removed from the reactor, filtered to remove sodium chloride, and evaporated on a rotating evaporator to remove low boiling material. On distillation through a short path still, 0.80 g. (19%) of 2-N-cyanoiminopropane, distilling at a pot temperature of 30–46° C. with a pressure of 0.1–0.5 mm., $n_D^{25}$ 1.4480, was obtained.

*Analysis.*—Calcd. for $C_4H_8N_2$ (percent): C, 58.5; H, 7.4; N, 34.1. Found (percent): C, 59.1, 58.9, 58.6; H, 7.6, 7.6; N, 34.0, 34.2.

The infrared absorption spectrum showed strong absorption at 4.50μ and 6.11μ characteristic of —C≡N and >C=N— groups. The NMR spectrum had peaks at τ=7.59, 7.72.

EXAMPLE 8

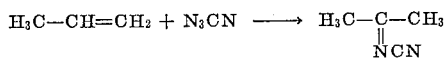

Each of two 80 ml. nickel-molybdenum-iron alloy-lined pressure tubes was charged with 6.5 g. (0.10 mole) of sodium azide and 20.3 g. (26 ml.) of acetonitrile. The tubes were cooled and to one was added 12 g. (0.20 mole) of cyanogen chloride and 13 g. (0.31 mole) of propylene. The other was charged with 13 g. (0.21 mole) of cyanogen chloride and 12 g. (0.30 mole) propylene. The sealed tubes were then shaken at 35–37° C. for 18 hours. The contents were then combined and filtered to remove sodium chloride. The filtrate was evaporated on a rotating evaporator and the residual oil was distilled on a molecular-type still to give 9.26 g. (57%) of 2-N-cyanoiminopropane ($n_D^{25}$, 1.4478–1.4488) and 30% of polymeric residue.

EXAMPLE 9

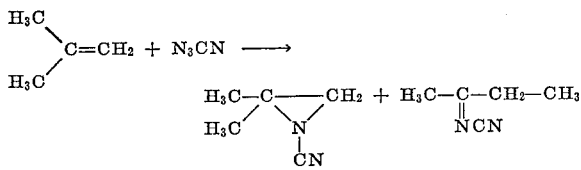

Two 80 ml. nickel-molybdenum-iron alloy-lined pressure vessels were charged with 6.5 g. (0.1 mole) of sodium azide and 20.3 g. (26 ml.) of acetonitrile, and to each was added 12 g. (0.20 mole) of cyanogen chloride and 16 g. (0.29 mole) of isobutylene. After the tubes were shaken for 20 hours at 35–36° C., the contents were removed, combined, filtered to remove the salt, and the filtrate was evaporated to remove volatile material. Distillation through a molecular-type still gave 50% yield of a mixture of 2,2-dimethyl-1-cyanoaziridine and 2-N-cyanoiminobutane, boiling at a pot temperature of 40–50° C./0.25 mm.

*Analysis.*—Calcd. for $C_5H_8N_2$ (percent): C, 62.5; H, 8.4; N, 30.1. Found: (percent) C, 62.3, 62.1; H, 8.1, 8.2; N, 29.8.

In a similar experiment carried out at 26–27° C., an 82% yield of the $C_5H_8N_2$ mixture was obtained, which was shown by NMR to be 41% 2.2-dimethyl-1-cyanoaziridine and 59% 2-N-cyanoiminobutane.

If the above reaction is repeated using benzene as the medium, the mixture consists of 77% 2-N-cyanoiminobutane and 23% 2,2-dimethyl - 1-cyanoaziridine. With ethylacetate as the medium, the mixture consists of 54% 2-N-cyanoiminobutane and 46% 2,2-dimethyl-1-cyanoaziridine.

In a duplication of the first of the above experiments, the isomer mixture was distilled through a 24 in. x 8 mm. spinning band column and an essentially pure sample of 2,2-dimethyl-1-cyanoaziridine was obtained, B.P. 24–25° C./0.4 mm.; $n_D^{25}$ 1.4422.

*Analysis.*—Calcd. for $C_5H_8N_2$ (percent): C, 62.5; H, 8.4. Found (percent): C, 62.7; H, 8.2.

The NMR spectrum showed a sharp singlet at τ=8.57 for the methyl groups and a singlet at τ=7.66 for the methylene protons.

From this same distillation was obtained essentially pure 2-N-cyanoiminobutane, B.P. 30° C./0.4 mm.; $n_D^{25}$, 1.4517.

The NMR of the 2-N-cyanoiminobutane shows absorption at τ=8.72, 8.83, 8.96, and 7.20, 7.32, 7.43 (7.56) for the ethyl group and τ=7.58 and 7.71 for the stereoisomeric syn-cyanomethyl group and anti-cyanomethyl group, respectively.

EXAMPLE 10

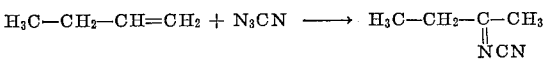

Two 80 ml. nickel-molybdenum-iron alloy-lined pressure tubes were each charged with 6.5 g. (0.10 mole) of sodium azide and 20.3 g. (26 ml.) of acetonitrile, cooled, and to each was added 12 g. (0.20 mole) of cyanogen chloride and 16 g. (0.29 mole) of 1-butene.

The tubes were heated at 28–36° C. for 18 hours, and after the resulting products were combined, they were filtered to remove sodium chloride, and the filtrate evaporated to remove solvent and unreacted starting material. Distillation on a molecular-type still afforded 3 g. (15%) of 2-N-cyanoiminobutane; $n_D^{25}$, 1.4532.

*Analysis.*—Calcd. for $C_5H_8N_2$ (percent): C, 62.5; H, 8.4; N, 30.1. Found (percent): C, 62.7, 62.4; H, 8.6, 8.4; N, 29.3.

The NMR spectrum showed this to be a pure material.

EXAMPLE 11

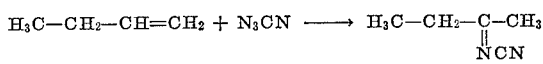

To a cooled mixture of 40.6 g. (52 ml.) of acetonitrile and 13.0 g. (0.20 mole) of sodium azide in a 240 ml. nickel-molybdenum-iron alloy-lined pressure reactor tube was added 24 g. (0.40 mole) of cyanogen chloride and 32 g. (0.57 mole) of 1-butene. The mixture was shaken for 16 hours at 27–35° C., filtered to remove sodium chloride, and evaporated on a rotating evaporator to remove 1-butene, cyanogen chloride, and solvent. The residue consisted of 16.5 g. (86%) of essentially pure 2-N-cyanoiminobutane, which was distilled through a short path still to give 9.6 g. (50%) of the pure 2-N-cyanoiminobutane along with quite a large amount of polymer.

EXAMPLE 12

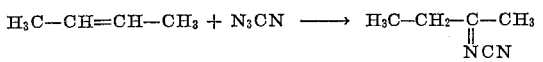

Into each of two cooled 80 ml. nickel-molybdenum-iron alloy-lined pressure vessels, charged with 6.5 g. (0.10 mole) of sodium azide and 20.3 g. (26 ml.) of acetonitrile, was distilled 12 g. (0.20 mole) of cyanogen chloride and 16 g. (0.29 mole) of cis-2-butene. These mixtures were heated at 32–36° C. for 18 hours, combined, filtered to remove sodium chloride, and the filtrate was evaporated on a rotary evaporator to remove the volatiles, leaving 16.5 g. (86%) of crude 2-N-cyanoiminobutane. On distillation of a pot temperature of 35–41° C. and 0.25–0.15 mm., 13.01 g. (68%) of the pure 2-N-cyanoiminobutane, $n_D^{25}$ 1.4528–1.4538, was obtained.

*Analysis.*—Calcd. for $C_5H_8N_2$ (percent): C, 62.5; H, 8.4; N, 30.1. Found (percent): C, 62.3, 62.5; H, 8.5, 8.5; N, 29.8, 30.0.

Proton magnetic resonance showed the crude material to be almost pure 2-N-cyanoiminobutane.

EXAMPLE 13

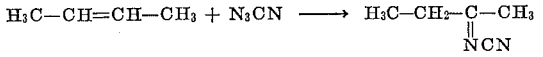

Cyanogen chloride (12 g., 0.20 mole) and trans-2-butene (16 g., 0.29 mole) were consecutively added to a cooled 80 ml. nickel-molybdenum-iron alloy-lined pressure vessel containing 6.5 g. (0.10 mole) of sodium azide and 19.5 g. (25 ml.) of acetonitrile. After shaking for 19 hours at 24–28° C., the contents were removed, filtered to remove sodium chloride, and the filtrate evaporated under reduced pressure to remove unreacted reactants and solvent. The crude residue (7.45 g., 78%) was shown by NMR to be nearly pure 2-N-cyanoiminobutane. On distillation at a pot temperature of 27–52° C. and 0.35–0.45 mm., 4.34 g. (45%) of pure 2-N-cyanoiminobutane, $n_D^{25}$ 1.4530–1.4540, was obtained.

*Analysis.*—Calcd. for $C_5H_8N_2$ (percent): C, 62.5; H, 8.4; N, 30.1. Found (percent): C, 62.5, 62.5; H, 8.5, 8.4; N, 30.1.

EXAMPLE 14

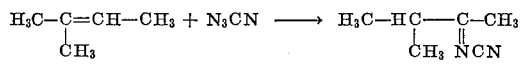

A mixture of 3.25 g. (0.05 mole) of sodium azide and 20 ml. (24 g., 0.40 mole) of cyanogen chloride was stirred for three hours in a 50 ml. flask fitted with a condenser, dropping funnel, and thermometer and connected to a wet test meter and 10 ml. (6.7 g., 0.097 mole) of 2-methyl-2-butene was added. After 16.5 hours at 20° C., 915 ml. (73%) of nitrogen was evolved. An additional 5 ml. (3.3 g., 0.047 mole) of 2-methyl-2-butene was added along with 10 ml. (7.8 g.) of acetonitrile, and the reaction mixture was heated at 30–48° C. for 4.7 hours, during which time another 250 ml. (20%) of nitrogen was evolved. The reaction mixture was then cooled, filtered to remove sodium chloride, and the filtrate was evaporated to remove cyanogen chloride, olefin, and acetonitrile. The residual oil was distilled through a short path still to give 3.6 g. (66%) of 2-methyl-3-N-cyanoiminobutane boiling at a pot temperature of 40–50° C./0.1 mm.; $n_D^{25}$, 1.4521–1.4528.

*Analysis.*—Calcd. for $C_6H_{10}N_2$ (percent): C, 65.5; H, 9.2; N, 25.4. Found (percent): C, 65.4; H, 9.2; N, 25.6.

In a duplication of the above experiment, the NMR spectrum of the product was shown to consist of peaks at $\tau=7.58$, 7.78 for the syn- and anti-cyanomethyl groups, a doublet at 8.79 and 8.88 for the isopropyl methyls and a seven line pattern from $\tau=6.85$–7.53 for the isopropyl —CH.

EXAMPLE 15

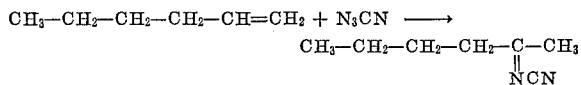

A mixture of 3.25 g. (0.05 mole) of sodium azide, 24 g. (20 ml., 0.38 mole) of cyanogen chloride, and 13.4 g. (20 ml., 0.16 mole) of 1-hexene was stirred at room temperature for 22 hours, then at 31–48° for ½ hour, during which time 8.15 ml. (63%) of nitrogen was evolved. The mixture was filtered to remove sodium chloride, and the filtrate was concentrated using a rotating evaporator. Distillation of the oily residue gave 2.35 g. (38%) of 2-N-cyanoiminohexane, $n_D^{25}$ 1.4567–1.4570, boiling at a pot temperature of 41–47° C./0.07 mm.

*Analysis.*—Calcd. for $C_7H_{12}N_2$ (percent): C, 67.8; H, 9.8; N, 22.6. Found (percent): C, 67.6; H, 9.4; N, 23.2, 23.4.

The structure of the 2-N-cyanoiminohexane was proved by treatment with aqueous silver nitrate solution which gave a yellow precipitate, shown to be silver cyanamide, and a water solution from which 2-hexanone was extracted with ether. The identity of the ketone was shown by its conversion to the semicarbazide derivative, M.P. 121–122° C. (reported 121° C. in Shriner and Fuson, "Identification of Organic Compounds").

EXAMPLE 16

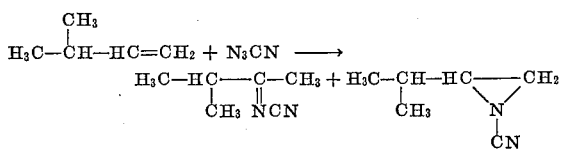

Each of two 80 ml. nickel-molybdenum-iron alloy-lined tubes was charged with 6.5 g. (0.1 mole) of sodium azide and 20.3 g. (26 ml.) of acetonitrile, cooled, and to each was added 12 g. (0.20 mole) of cyanogen chloride and 20 g. (0.29 mole) of 3-methyl-1-butene. The sealed tubes were heated at 23–40° C. for 19 hours, after which the combined products were filtered to remove sodium chloride. The filtrate was concentrated on a rotating evaporator and distillation through a 24 in. x 8 mm. spinning band column gave a 41% yield of a crude mixture of 3-methyl-2-cyanoiminobutane and 2-isopropyl-1-cyanoaziridine, along with 36% of polymeric residue.

The first fraction from the distillation had a boiling point of 38–39° C./0.35 mm. and was shown by NMR to be about 90% 2-isopropyl-1-cyanoaziridine, while higher boiling fractions, B.P. 42° C./0.40 mm., were shown to be nearly pure 3-methyl-2-N-cyanoiminobutane.

In a similar experiment at 26–27° C., an 86% yield of the isomer mixture was obtained.

EXAMPLE 17

To forty-one milliliters of acetonitrile solution containing 6.8 g. (0.10 mole) of cyanogen azide was added 33 g. (0.50 mole) of cyclopentadiene. This solution was held at 0° C. for 7.4 hours, during which time 2.05 liters (81.5%) of nitrogen was evolved. The solvent, excess cyanogen azide, and excess cyclopentadiene were removed on a rotating evaporator at 1 mm. pressure. Distillation at $1\mu$, using a mercury vapor pump, afforded 5.87 g. (55%) of 1-cyanoiminocyclopentene-2, B.P. 36–42° C., $1\mu$ pressure; $n_D^{25}$, 1.5648.

*Analysis.*—Calcd. for $C_6H_6N_2$ (percent): C, 67.9; H, 5.7. Found (percent): C, 68.1, 69.5; H, 5.8, 6.0.

The infrared spectrum showed absorption at $4.55\mu$, $6.25\mu$, and $6.37\mu$ attributable, respectively, to the cyano group, the C≡N and C=C groups, and in the fingerprint region the spectrum was quite similar to cyclopentenone.

EXAMPLE 18

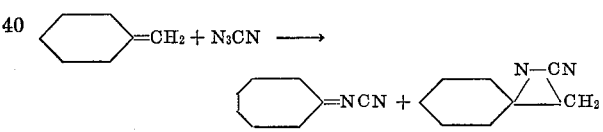

An acetonitrile solution (29 ml.) containing 6.8 g. (0.1 mole) of cyanogen azide was added to 20 g. (0.21 mole) of methylenecyclohexane (shown to be pure by gas chromatography). Nitrogen was liberated readily and over a period of nine hours 1.99 l. of nitrogen (80%) was obtained, with a reaction temperature of 22–28° C. After removal of solvent and excess methylenecyclohexane on a rotating evaporator, 11.75 g. of crude product (87%) was obtained. Distillation at a pot temperature of 96°–103° C./1 mm. gave 8.30 g. (61%) of a mixture of 1-cyanoiminocycloheptane and 1-cyano-2-cyclopentamethyleneaziridine; $n_D^{25}$, 1.4880 to 1.5026.

*Analysis.*—Calcd. for $C_8H_{12}N_2$ (percent): C, 70.5; H, 8.9; N, 20.6. Found (percent): C, 70.5, 70.5; H, 8.7, 8.9; N, 20.2, 20.4.

Proton magnetic resonance analysis indicated that the mixture contained 71% of the cyanoiminocycloheptane and 29% of the aziridine. This ratio changes with change of reaction medium, e.g., in ethyl acetate solution, 61% 1-cyanoiminocycloheptane and 39% of aziridine are formed while in benzene solution, 82% of cyanoiminocycloheptane and 18% of aziridine are produced.

The above process was repeated using 5 g. (0.05 mole) of methylenecyclohexane, 25 ml. of dimethylformamide, and 1.7 g. (0.025 mole) of cyanogen azide. After 16 hours at 25° C. there was obtained 2 g. of an oil which was shown by NMR spectroscopy to be pure 1-cyanoiminocycloheptane containing no 1-cyano-2-cyclopentamethyleneaziridine.

The above process was again repeated using 5 g. of methylenecyclohexane dissolved in 10 ml. of acetic acid and a small amount of 2.5 molar cyanogen azide in ethyl acetate at 40° C. After evaporation of the solvents and excess reactants, an oil whose NMR spectrum indicated that it was 100% 1-cyano-2-cyclopentamethyleneaziridine containing no 1-cyanoiminocycloheptane.

EXAMPLE 19

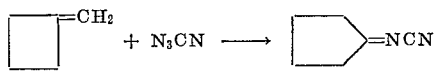

A solution of 6.8 g. (0.10 mole) of cyanogen azide in 28 ml. of acetonitrile was added to 9.5 g. (0.14 mole) of methylenecyclobutane at room temperature purified by preparative gas chromatography. Reaction was immediate and over a 6.3-hour period, 1.89 l. (75%) of nitrogen was evolved. After evaporation of solvent, 7.67 g. (79%) of crude adduct was obtained, which upon distillation through a short path still at a pot temperature of 55°–63.5° C./0.05–0.25 mm. gave 5.10 g. (52%) of 1-cyanoiminocyclopentane; $n_D^{25}$, 1.4928–1.4937.

*Analysis.*—Calcd. for $C_6H_8N_2$ (percent): C, 66.6; H, 7.5; N, 25.9. Found (percent): C, 64.4, 64.0; H, 7.3, 7.4; N, 26.5, 26.5.

The nuclear magnetic resonance spectrum of this material was identical in all respects with the spectrum of the cyanoiminocyclopentane produced by the reaction of cyanogen azide with cyclopentene.

EXAMPLE 20

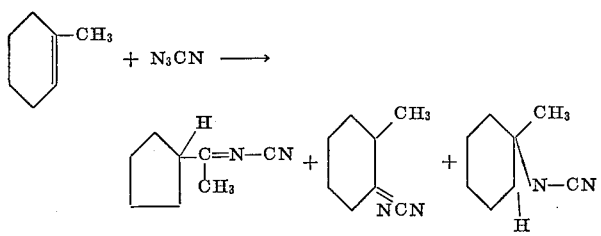

Forty milliliters of acetonitrile solution containing 10.2 g. (0.15 mole) of cyanogen azide was added to 24 g. (0.25 mole) of 1-methylcyclohexene, and over a 23.5-hour period 2.48 l. (66.%) of nitrogen was evolved. After evaporation of the solvent, the crude product was investigated by NMR spectroscopy and three compounds were identified as constituents: 1-cyanoimino-2-methylcyclohexane, 45%; 1-(1-N-cyanoiminoethyl)cyclopentane, 25%; and 1-cyano-2-methyl-2,3-cyclohexanylaziridine, 17%. Distillation of the mixture through a short path still at a pot temperature of 39°–77° C./0.05–0.10 mm. gave 7.23 g. (35%) of the isomer mixture.

*Analysis.*—Calcd. for $C_8H_{12}N_2$ (percent): C, 70.6; H, 8.9; N, 20.6. Found (percent): C, 70.3, 70.2; H, 9.7, 9.6.

EXAMPLE 21

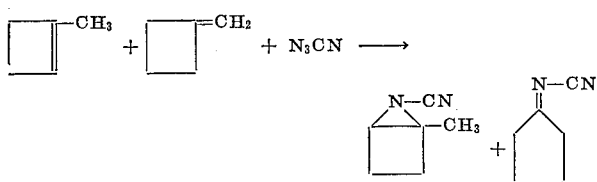

The reaction of cyanogen azide with methylenecyclobutane containing 6% 1-methylcyclobutene at room temperature gave predominantly 1-cyanoiminocyclopentane; however, NMR spectroscopy strongly indicates that a small amount of 1-cyano-2-methyl-2,3-cyclobutanylaziridine is present in the isomeric $C_6H_8N_2$ mixture.

EXAMPLE 22

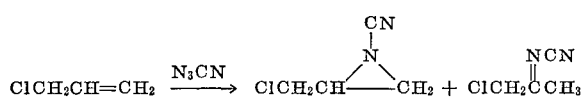

A solution of 1.9 g. (2.8 mmole) of cyanogen azide in 1 ml. of carbon tetrachloride was added to 0.11 g. (1.4 mmole) of allyl chloride, and the mixture was allowed to stand for two hours at ambient temperature. The magnetic resonance spectra of the resulting solution was determined using a Varian high resolution NMR spectrometer and electromagnet at a frequency of 30 mc. and a field of 7500 gauss. The NMR spectrum indicated the presence of both 1-cyano-2 - chloromethylaziridine and 2 - cyanoimino-3-chloropropane.

EXAMPLE 23

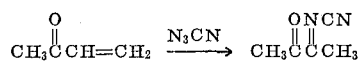

Following the procedure of Example 22, cyanogen azide and 0.10 g. (1.4 mmole) of methyl vinyl ketone were reacted with liberation of nitrogen. The NMR spectrum of the product indicated the presence of 2-cyanoiminopropanone-3.

EXAMPLE 24

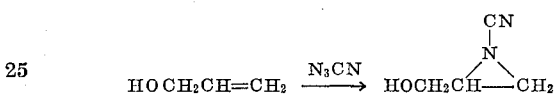

Allyl alcohol (0.08 g., 1.4 mmole) was treated with cyanogen azide according to the procedure of Example 22. The NMR spectrum of the resulting solution indicated the presence of 1-cyano-2-hydroxymethylaziridine in the reaction product.

EXAMPLE 25

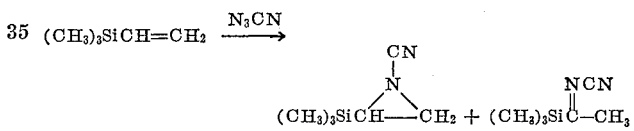

Trimethylvinyl silane (0.1 g., 1 mmole) was added to cyanogen azide in carbon tetrachloride according to the procedure of Example 22. The NMR spectrum of the product mixture indicated that both 1-trimethylsilyl-1-cyanoiminoethane and 1 - cyano-2-trimethylsilylaziridine were present in the product mixture.

EXAMPLE 26

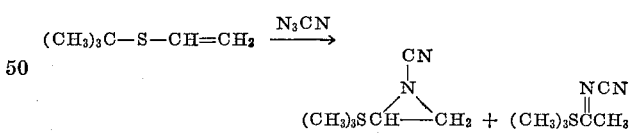

A cyanogen azide solution containing 0.19 g. (2.81 mmole) in 1 ml. of carbon tetrachloride was added to 0.1 g. (1 mmole) of tertiary butyl vinyl sulfide according to the procedure of Example 22. The NMR spectrum of the product indicated presence of both 1-cyanoimino-1-tertiary butylthioethane and 1-cyano - 2 - tertiary butyl thioaziridine.

EXAMPLE 27

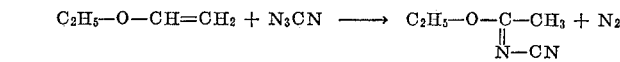

Cyanogen azide was prepared by stirring sodium azide (6.5 g., 0.1 mole) and cyanogen chloride (50 ml.) at reflux temperatures for 20 hours. To this mixture was added ethyl vinyl ether (8.2 g., 0.11 mole) dissolved in diethyl ether (20 ml.) over a period of 15 minutes, while maintaining the reaction temperature at 16–18° C. The reaction mixture was stirred at this temperature for a total of 45 minutes during which time approximately 0.1 mole of nitrogen was liberated. The reaction mixture was diluted with diethyl ether (15 ml.) and filtered under nitrogen. Removal of volatile components from the filtrate at 0.2 mm. pressure and room temperature gave a light tan mobile oil (10.8 g., 96% yield). Distillation of this oil in a short path still at 0.1 mm. and a bath temperature of 60–88° C. gave 3.35 g. of distillate and a tan brittle residue (6.8 g.). Analysis of the volatile fraction gave the following results:

*Analysis.*—Calcd. for $C_5H_8N_2O$ (percent): C, 53.55; H, 7.19; N, 24.98. Found (percent): C, 50.52; H, 7.48; N, 24.60, 24.66, 24.82.

The infrared analysis showed strong absorption at 3.35, 3.45μ (C—H), 4.45μ (C≡N), 6.15μ (C=N), and in the 8μ region (C—O). These data indicate that the product consists principally of 1-ethoxy-1-N-cyanoiminoethane, i.e.,

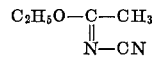

The reaction of cyanogen azide with ethylenic compounds can be used as an analytical means for determining the approximate extent of ethylenic unsaturation in an unknown composition by measuring the amount of nitrogen liberated.

This invention also provides a means for converting ethylenically unsaturated compounds to useful carbonyl compounds. As shown by Example 3, for instance, the reaction product of cyclopentene with cyanogen azide is readily converted to cyclopentanone by simple hydrolysis. Cyclopentanone is a polymer solvent, and it can be converted by oxidation with nitric acid to glutaric acid, which can be reacted with amines and glycols, respectively, to form useful polyamides and polyesters. As is further shown in Example 3, cyanamide is another product of the hydrolysis. Cyanamide is a valuable intermediate, e.g., for preparing resins of the amide-formaldehyde type.

The monomers obtained from ethylenically unsaturated compounds are useful as adhesives for bonding neoprene to itself, to natural rubber, and to other substrates. For example, when a small sample of the 1-cyanoiminocyclopentene-2 of Example 17 was spread between two ⅛″ neoprene sheets and the sheets pressed together at 130° C. and 2000 p.s.i. for 5 minutes, a strong bond between the neoprene sheets was formed. Similarly, ⅛″ thick strips of neoprene and natural rubber were firmly joined by pressing a small sample of 2,2-dimethyl-1-cyanoaziridine, prepared as in Example 9, between them and heating at 100° C. and 4000 p.s.i. for 2 minutes.

EXAMPLE 28

A suspension consisting of sodium azide (6.0 g.) and cyanogen chloride (50 ml.) was stirred overnight at reflux temperature.

2,3-dimethylbutane (100 ml.) was added and the excess cyanogen chloride removed at 200 mm. and room temperature. Filtration of the residual suspension through a sintered glass funnel, under nitrogen, afforded a colorless filtrate which was diluted to 310 ml. by the addition of 2,3-dimethylbutane.

A total of 1720 ml. (85%) of nitrogen was evolved upon stirring this solution at 49–50° C. over a period of 21 hours. Excess hydrocarbon was removed at 40° C. and under a pressure of 5 mm. The residual light orange oil was subsequently placed in a molecular still and distilled at 0.03μ with the pot temperature at 40–65° C. The distillate amounted to 4.30 g. (40%).

*Analysis.*—Calcd. for $C_7H_{14}N_2$ (percent): C, 66.72; H, 11.20; N, 22.23. Found (percent): C, 66.82; H, 11.13; N, 22.46.

The infrared spectrum showed characteristic bands at 3205 cm.$^{-1}$ (NH), 2890 cm.$^{-1}$ (CH), and 2217 cm.$^{-1}$ (C≡N). The NMR spectrum was found to be consistent with a mixture of 1-cyanamido-2,3-dimethylbutane and 2-cyanamido-2,3-dimethylbutane in a ratio of 1 to 8.3, respectively.

EXAMPLE 29

In a substantial repetition of Example 28, n-hexane was reacted with cyanogen azide. The product was a viscous liquid containing a 53% yield of a mixture of the isomers, 1- 2-, and 3-cyanamidohexane, in the ratio of 1:6:6. These isomers showed lines in the infrared at 3180 cm.$^{-1}$ (N—H) and 2200 cm.$^{-1}$ (C≡N).

*Analysis.*—Calcd. for $C_7H_{14}N_2$ (percent): C, 66.71; N, 11.1; N, 21.9. Found (percent): C, 66.37; H, 11.08; N, 22.97.

EXAMPLE 30

In a substantial repetition of Example 28, n-hexane butane was reacted with cyanogen azide to give a viscous liquid containing a mixture of the novel isomers 1-, 3-, and 4-cyanamido-2,2-dimethylbutane in the approximate ratio 1:4:1 in 65% yield. These isomers showed lines in the infrared at 3210 cm.$^{-1}$ (N—H) and 2210 cm.$^{-1}$ (C≡N).

EXAMPLE 31

In a substantial repetition of Example 28, methylcyclohexane was reacted with cyanogen azide to give a viscous liquid containing the five novel isomers, 1-cyanamidomethylcyclohexane, 1 - cyanamido-1-methylcyclohexane, and the corresponding 2-, 3- and 4-methylhexanes, in 30% yield. These isomers showed lines in the infrared at 3190 cm.$^{-1}$ (N—H) and 2210 cm.$^{-1}$ (C≡N).

*Analysis.*—Calcd. for $C_7H_{14}N_2$ (percent): C, 69.57; H, 10.15; N, 20.31. Found (percent): C, 69.26; H, 10.17; N, 21.30.

EXAMPLE 32–39

The table which follows summarized a series of additional experiments carried out following the procedure and amounts of reactants given in Example 28 except that the hydrocarbons given in the left column was used in place of the hydrocarbon of Example 28. The physical properties given in the right column are those of the crude reaction products. In Examples 37 and 38 the weight ratio of cyclohexane to other hydrocarbon was 3:1 and in Example 39 the amount of bicyclo[2,2,2] octane used was that which gave a saturated solution thereof in cyclohexane at ambient temperature.

TABLE

| Example | Hydrocarbon | Yield, percent | I.R. (cm.$^{-1}$) | Physical properties |
| --- | --- | --- | --- | --- |
| 32 | Cyclopentane | 80 | 3200 N–H / 2210 C≡N | Viscous liquid. |
| 33 | Cyclooctane | 67 | 3200 N–H / 2210 C≡N | Do. |
| 34 | Methylcyclopentane | 55 | | |
| 35 | 1,1-dimethylcyclohexane | 45 | 3200 N–H / 2210 C≡N | Do. |
| 36 | Cyclohexane cycloheptane | 77 | 3210 N–H / 2210 C≡N | Do. |
| 37 | Cyclohexane 2,2,3,3-tetramethylbutane | 50 | 3200 N–H / 2200 C≡N | Viscous oil. |
| 38 | Cyclohexane bicyclo[2.2.1]heptane | 50 | 3200 N–H / 2210 C≡N | Do. |
| 39 | Cyclohexane bicyclo[2.2.2]octane | 44 | 3180 N–H / 2210 C≡N | Do. |

EXAMPLE 40

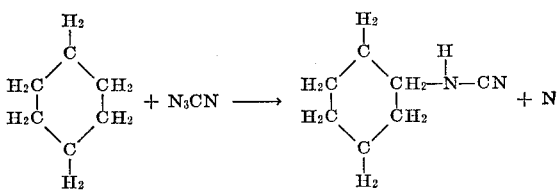

Cyanogen azide (0.07 mole) prepared from sodium azide and cyanogen chloride in cyclohexane was freed of excess cyanogen chloride by evacuation to 110–120 mm./25° C. and filtered to remove sodium chloride. The filtrate was further diluted to a total volume of 300 ml. with cyclohexane and heated at 40–45° C. for 22 hours, during which time approximately 0.06 mole of nitrogen was liberated. The solution was filtered to separate a very small amount of insoluble residue and the excess cyclohexane was removed in a rotary evaporator at 2 mm./40° C. There remained essentially pure cyclohexylcyanamide (5.68 g., yield 65%) as a light tan oil. Distillation of this tan oil through a short path still at 0.01μ with a pot temperature of 90–114° C. gave pure cyclohexylcyanamide (4.58 g., yield 53%) as a light tan oil.

*Analysis.*—Calcd. for $C_7H_{12}N_2$ (percent): C, 67.68; H, 9.75; N, 22.57. Found (percent): C, 67.76; H, 9.74; N, 22.60.

The infrared spectrum was consistent with the proposed structure showing absorption at 3.15μ (NH), 3.42, 3.50μ (saturated C—H), and 4.5μ (CN). The NMR spectrum showed a doublet at τ 4.2, 4.33 (NH); a broad absorption centered at τ 6.96 (proton adjacent to NH—CN); and a broad complex centered between τ 7.70–9.20μ ($CH_2$) in a ratio of 1:1:10. The identification of cyclohexylcyanamide was confirmed by hydrolysis to cyclohexylurea as follows:

To cyclo hexylcyanamide (5.0 g., 0.04 mole), prepared in the same manner as described above, was added water (50 ml.) and 10% sulfuric acid (20 drops). The mixture was gradually heated to 72° C. during two hours, at which temperature the oily product changed to a while crystalline solid. Heating at 64–72° C. was continued for one hour. The solution was cooled, filtered, and the white crystals dried over $P_2O_5$ at 67° C./0.1 mm. to yield 4.65 g. of product, M.P. 194–195° C. A second crop of crystals (0.9 g., M.P. 192–194° C.) separated on concentration of the filtrate (total yield 97.5%). One recrystallization from water gave analytically pure cyclohexylurea melting at 195–196° C.

*Analysis.*—Calcd for $C_7H_{14}N_2O$ (percent): C, 59.10; H, 9.93; N, 19.71. Found (percent): C, 58.98, 58.85; H, 10.23, 10.06; N, 19.68.

A mixture melting point of this compound with a known sample of cyclohexylurea was not depressed.

Two glass plates were mounted with a thin film of the cyclohexylcyanamide, prepared as above, therebetween. The assembly was then heated at 180° to 250° C. for 3 to 4 minutes. On cooling, a clear strong bond was formed between the plates. Similar strong bonds between glass surfaces were obtained employing mixtures of cyclohexylcyanamide with either 1,6-hexamethylenedicyanamide or adiponitrile and curing for 18 hours at 180° C.

EXAMPLE 41

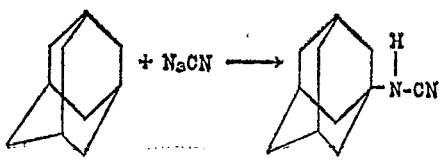

Activated sodium azide (9.75 g., 0.15 mole) was suspended in methylene chloride (30 ml.), cooled to 0° C., and cyanogen chloride (40 ml.) added during 30 minutes at such a rate as to maintain a temperature below 12° C. When addition was complete, the solution was allowed to warm slowly to room temperature and stirring was continued at this temperature for 20 hours. Methylene chloride (100 ml.) was added and the solution evacuated to 400 mm./20° C. to remove some excess cyanogen chloride. The mixture was filtered and the filtrate (86 ml.) analyzed for cyanogen azide (yield 78%). Adamantane (13.6 g., 0.1 mole) was added and the solution heated at 34–37° C. for 48 hours, during which time nitrogen (ca. 0.08 mole) was liberated. Filtration of this solution separated 0.1 g. of insoluble material. The filtrate was evaporated to dryness and the residue triturated with carbon tetrachloride. The soluble fraction was chromatographed on silicic acid. The main crystalline fraction was eluted with 50–30% chloroform in carbon tetrachloride. One recrystallization from methylcyclohexane gave 1-cyanamidoadamantane melting at 147–149° C. (1.25 g., yield 7%).

*Analysis.*—Calcd. for $C_{11}H_{16}N_2$ (percent): C, 74.95; H, 9.15; N, 15.90. Found (percent): C, 75.20; H, 9.08; N, 15.68.

In addition, 5.05 g. (37%) of the adamantane was recovered.

Hydrolysis of this material gave 1-aminoadamantane. 1-cyanamidoadamantane (0.88 g., 5.0 mmole) prepared as above and sodium hydroxide (1.00 g., 25 mmole) were dissolved in 5 ml. of diethylene glycol and refluxed with stirring for two hours. The product was cooled to room temperature, poured into saturated potassium carbonate and extracted with ether. The ether was dried under anhydrous potassium carbonate, filtered, and evaporated. The oily residue was sublimed to give a product having an infrared spectrum identical with that of a known sample of 1-aminoadamantane.

As illustrated in Example 40, the products of the reaction between cyanogen azide and saturated compounds are useful as laminating adhesives, particularly for glass-to-glass surfaces. Alkaline hydrolysis produces amines, as shown in Example 41, which are compounds having known utilities.

Since obvious modifications and equivalents will be evident to those skilled in the chemical arts, I propose to be bound solely by the appended claims.

The embodiments of the invention in which an exclusive property or privilege is claimed are defined as follows:

1. The process of reacting with cyanogen azide an ethylenically unsaturated compound of up to 18 carbons and thereby producing at least one compound containing an N-cyanoaziridine group or an N-cyanoimine group on only one of the originally unsaturated carbons which comprises
    contacting said ethylenically unsaturated compound with cyanogen azide at a temperature in the range from about −25° C. to about 75° C.

2. The process of claim 1 wherein the temperature is in the range from about 0° C. to about 55° C.

3. The process of claim 1 wherein the ethylenically unsaturated compound is unsubstituted hydrocarbon of 2–12 carbons.

4. The process of claim 3 wherein the unsubstituted hydrocarbon is cyclohexene.

5. The process of claim 3 wherein the unsubstituted hydrocarbon is bicyclo[2.2.1]hept-2-ene.

6. The process of claim 3 wherein the unsubstituted hydrocarbon is cyclopentene.

7. The process of claim 3 wherein the unsubstituted hydrocarbon is a butene.

8. The process of claim 3 wherein the unsubstituted hydrocarbon is ethylene.

9. The process of claim 3 wherein the unsubstituted hydrocarbon is propylene.

10. The process of claim 1 wherein the ethylenically unsaturated compound is ethyl vinyl ether.

11. The process of reacting with cyanogen azide an alkane having at least one carbon-hydrogen bond and up to 18 carbons and thereby producing at least one compound containing at least one cyanamide group on the carbon originally carrying the hydrogen which comprises contacting said alkane with cyanogen azide at a temperature in the range from about 25° C. to about 150° C.

12. The process of claim 11 wherein the temperature is in the range from about 40° C. to about 100° C.

13. The process of claim 11 wherein the alkane is unsubstituted hydrocarbon.

14. The process of claim 13 wherein the alkane is a hexane.

15. The process of claim 13 wherein the alkane is n-hexane.

16. The process of claim 13 wherein the alkane is cyclohexane.

17. The process of claim 13 wherein the alkane is a butane.

18. The process of claim 13 wherein the alkane is adamantane.

References Cited

UNITED STATES PATENTS

| 3,225,077 | 12/1965 | Schaefer et al. | 260—551 |
| 3,268,512 | 8/1966 | Marsh | 260—551 |

OTHER REFERENCES

Sukhorukov et al.; Optics and Spectroscopy, pp. 24–26, vol. 9 (1960).

Huffman et al.: J. Org. Chem., vol. 28, pp. 1816–21 (July 12, 1963).

Goldberg et al.: Khim Nauka i Prom., vol. 4, p. 138 (1959).

Brigl: Berichte, vol. 45, p. 1557 (1912).

Chemical Abstracts, vol. 53, col. 16953 (1959).

Chemical Abstracts, vol. 54, col. 23,816–17 (1960).

HENRY R. JILES, Primary Examiner

H. MOATZ, Assistant Examiner

U.S. Cl. X.R.

8—31, 55, 115.5; 156—99, 331; 161—192, 193, 197, 204; 260—586, 593, 768, 465, 465.5, 561, 482, 347.7, 345.1, 534, 514, 471, 583, 570.8, 63, 73, 67, 78.3, 92.3, 239, 93.7, 94.7, 94.9, 448.2, 551, 553, 563